US012331824B2

(12) United States Patent
Perry

(10) Patent No.: US 12,331,824 B2
(45) Date of Patent: Jun. 17, 2025

(54) LONG-BOLT POWER TAKEOFF HOUSING

(71) Applicant: MUNCIE POWER PRODUCTS, INC., Muncie, IN (US)

(72) Inventor: Brian Perry, Claremore, OK (US)

(73) Assignee: Muncie Power Products, Inc., Muncie, IN (US)

( * ) Notice: Subject to any disclaimer, the term of this patent is extended or adjusted under 35 U.S.C. 154(b) by 0 days.

(21) Appl. No.: 18/177,916

(22) Filed: Mar. 3, 2023

(65) Prior Publication Data
US 2023/0279939 A1 Sep. 7, 2023

Related U.S. Application Data

(60) Provisional application No. 63/268,821, filed on Mar. 3, 2022.

(51) Int. Cl.
F16H 57/025 (2012.01)
B60K 17/28 (2006.01)
F16H 57/02 (2012.01)

(52) U.S. Cl.
CPC ........... *F16H 57/025* (2013.01); *B60K 17/28* (2013.01); *F16H 2057/02026* (2013.01); *F16H 2057/02082* (2013.01)

(58) Field of Classification Search
CPC ......... F16H 57/025; F16H 2057/02026; B60K 17/28
See application file for complete search history.

(56) References Cited

U.S. PATENT DOCUMENTS

| 3,540,297 | A | * | 11/1970 | Wagner | B60K 17/28 74/15.86 |
| 4,211,519 | A | * | 7/1980 | Hogan | F04B 43/1253 417/477.2 |
| 4,573,366 | A | * | 3/1986 | Kennard | F16H 63/3023 74/606 R |
| 6,688,858 | B1 | * | 2/2004 | Boone | F04B 1/2064 417/269 |

* cited by examiner

Primary Examiner — Thomas C Diaz
(74) Attorney, Agent, or Firm — Dentons Bingham Greenebaum LLP; Brian W. Chellgren

(57) ABSTRACT

The present invention relates to a power takeoff (PTO) device. More specifically, the present invention relates to a PTO with a novel bolted joint assembly securing the housing of the PTO to a transmission housing, whereby the bolted joint assembly is easier to assemble correctly and more robust than conventional bolted joint assemblies used with conventional PTO housings. The preferred embodiment of the invention comprises elongated fasteners affixing or securing the PTO housing to the transmission housing. Such elongated fasteners provide easier access to the fastener head with standard tools, while providing significantly greater fastener stretch that reduces or prevents vibration loosening of the PTO housing.

9 Claims, 10 Drawing Sheets

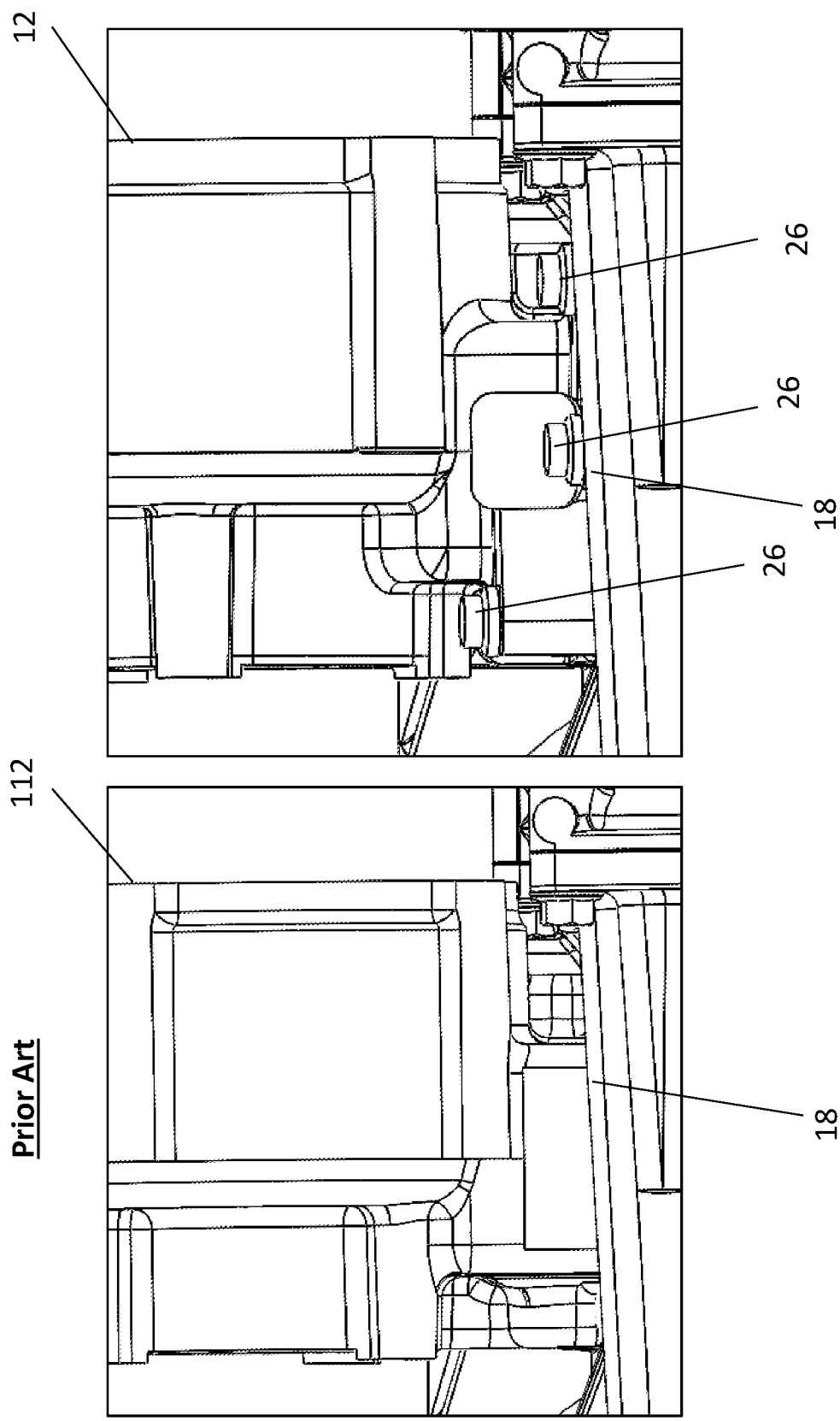

LONG-BOLT POWER TAKEOFF HOUSING

CROSS-REFERENCE TO RELATED APPLICATION

This application claims the benefit of U.S. provisional patent application Ser. No. 63/268,821, filed Mar. 3, 2022, for LONG-BOLT POWER TAKEOFF HOUSING, incorporated herein by reference.

FIELD

The present invention relates to a power takeoff (PTO) device. More specifically, the present invention relates to a PTO with a novel bolted joint assembly securing the housing of the PTO to a transmission housing, whereby the bolted joint assembly is easier to assemble correctly and more robust than conventional bolted joint assemblies used with conventional PTO housings. The preferred embodiment of the invention comprises elongated fasteners affixing or securing the PTO housing to the transmission housing. Such elongated fasteners provide easier access to the fastener head with standard tools, while providing significantly greater fastener stretch that reduces or prevents vibration loosening of the PTO housing.

BACKGROUND

The use of a PTO in association with vehicle (e.g., truck) or stationary engine transmissions is generally known. Such PTOs often include an input gear for connection to an input shaft or transmission, an output gear for connection to an output shaft and, optionally, a clutch mechanism for selectively engaging and disengaging power to the output shaft so as to selectively rotate the output shaft of the PTO to perform useful work, such as to power an auxiliary device of a work truck. Once connected to a gear within the transmission, the input gear of the PTO is connected to and can draw mechanical power from the transmission and can selectively transfer this power to the auxiliary device connected to the PTO.

Installation of a PTO onto an engine transmission is often challenging. A PTO housing will typically be fastened to an engine transmission housing via fasteners, such as bolts or cap screws, extending through channels in the PTO housing, and threaded into corresponding channels in the transmission. Access to the fasteners is restricted by the positioning of other engine components, including other components of the transmission housing, the size and shape of the PTO itself, and other space limitations. In addition, an installer often must manually support a relatively heavy PTO during the installation process. It can thus be difficult for the installer to use a torque wrench to achieve a desired tension on the fasteners securing the PTO to the engine transmission while facing space limitations and simultaneously supporting the weight of the PTO. If the proper tension is not achieved, the assembly of the PTO and engine transmission may be vulnerable to leaking or failure.

The inventor of the present disclosure realized that improvements in PTO housings are needed to simplify the installation of PTOs in view of space limitations. Certain preferred features of the present disclosure address these and other needs and provide other important advantages.

SUMMARY

Embodiments of the present disclosure include a PTO housing with improved access to fasteners, thereby rendering easier the installation of the PTO housing. Certain embodiments include increased fastener length and increased length of fastener-receiving channels in the PTO housing as compared to conventional PTOs In addition to improving access to the securing fasteners, this novel design also provides the benefit of better torque retention due to the increased stretch of the longer fasteners, thereby mitigating any loosening of the PTO housing caused by vibration.

In some embodiments, the present invention comprises a PTO including a a PTO housing having a transmission mounting surface, a channel boss extending opposite the transmission mounting surface, wherein the channel boss includes an elongated channel extending therethrough and terminating at the transmission mounting surface, and a plurality of screw bosses extending from the PTO housing substantially parallel to the transmission mounting surface; and an elongated fastener, sized to be received into the elongated channel; and wherein each of the plurality of screw bosses is arranged on the PTO housing to avoid interference between any screw boss and insertion of the elongated fastener into the elongated channel. In further embodiments, the elongated channel includes a length, wherein the elongated fastener includes a length, and wherein the length of the elongated channel is not less than 40%, not less than 50%, or not less than 55% of the length of the elongated fastener received by the elongated channel. In certain embodiments, the length of the elongated channel is 55% to 80% of the length of the elongated fastener. In some embodiments, the channel boss is a plurality of channel bosses, each of the plurality of channel bosses includes one elongated channel. In further embodiments, at least one elongated channel is a slotted channel which, when receiving an elongated fastener, partially, but not completely, radially surrounds a shaft of the elongated fastener. In certain embodiments, the slotted channel includes an opening perpendicular to an axis of the slotted channel. In some embodiments, the opening in the slotted channel is larger than the diameter of the shaft of the elongated fastener but smaller than a diameter of a head of the elongated fastener.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

FIG. 6A depicts a bottom view of the conventional PTO housing secured to the conventional transmission housing.

FIG. 6B depicts a bottom view of the embodiment of the PTO housing of the present invention secured to the conventional transmission housing.

DETAILED DESCRIPTION OF THE ILLUSTRATED EMBODIMENTS

Figure 1:
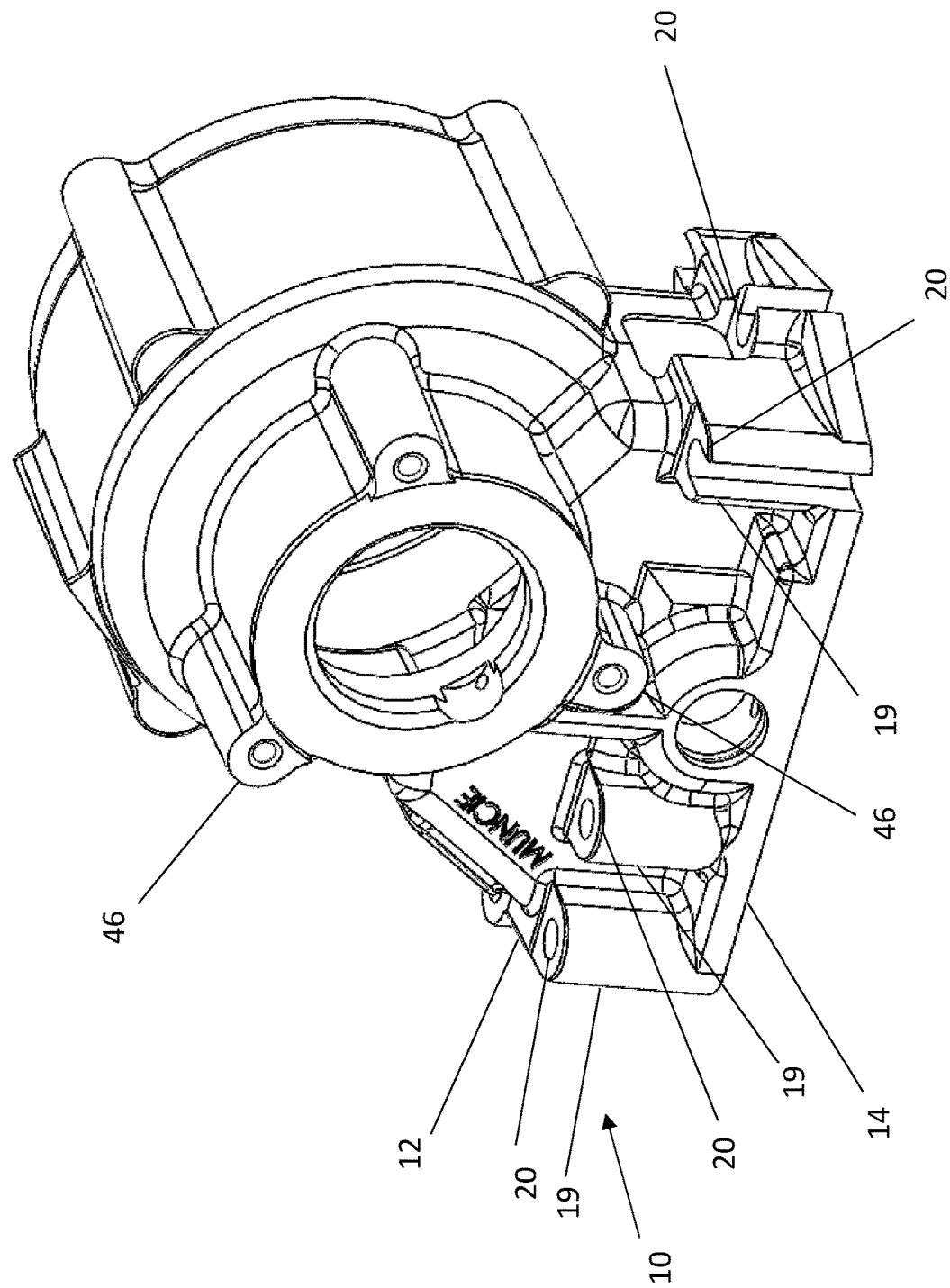
FIG. 1 depicts a perspective view of a first embodiment of a PTO housing according to the present invention.

For the purposes of promoting an understanding of the principles of the invention disclosed herein, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein; such specific quantities are presented as examples only and are approximate values unless otherwise indicated. The words "about" or "approximately," when used with numbers and unless otherwise defined, refer to values within 10% of the most precise digit of the numbers (e.g., "about 1" refers to the range of 0.9 to 1.1, while "about 1.0" refers to the range of 0.99 to 1.01). Discussions pertaining to specific compositions of matter, if present, are presented as examples only and do not limit the applicability of other compositions of matter, especially other compositions of matter with similar properties, unless otherwise indicated.

Referring to FIGS. 1, 3B, 4B, 5B, 6B, 7B and 9B embodiments of the present invention include a PTO 10 including a PTO housing 12. In the depicted embodiment, the PTO housing 12 includes a transmission mounting surface 14 configured to engage a corresponding PTO mounting surface 16 on a conventional transmission housing 18. When the PTO housing 12 is attached to the transmission housing 18, the transmission mounting surface 14 is substantially flush against the PTO mounting surface 16.

The PTO housing 12 includes a plurality of channel bosses 19 projecting from the housing 12 opposite the transmission mounting surface 14. Each channel boss 19 includes a channel 20 extending therethrough and terminating at the transmission mounting surface 14. Each channel 20 is sized to receive an elongated fastener 22, such as, for example, a bolt or cap screw having a externally threaded cylindrical shaft 24 and a head 26 on one end of the shaft 24, the head 26 having a larger diameter than the threaded shaft 24. Each channel 20 and corresponding channel boss 19 is located in the PTO housing 12 such that the channel 20 aligns with a corresponding transmission channel 28 in the PTO mounting surface 16, such that the elongated fastener 22 may extend through the channel 20 and thread into the corresponding transmission channel 28, which includes internal threading, to secure the transmission mounting surface 14 of the PTO housing 12 against the PTO mounting surface 16 of the transmission housing 18.

Figure 2A:
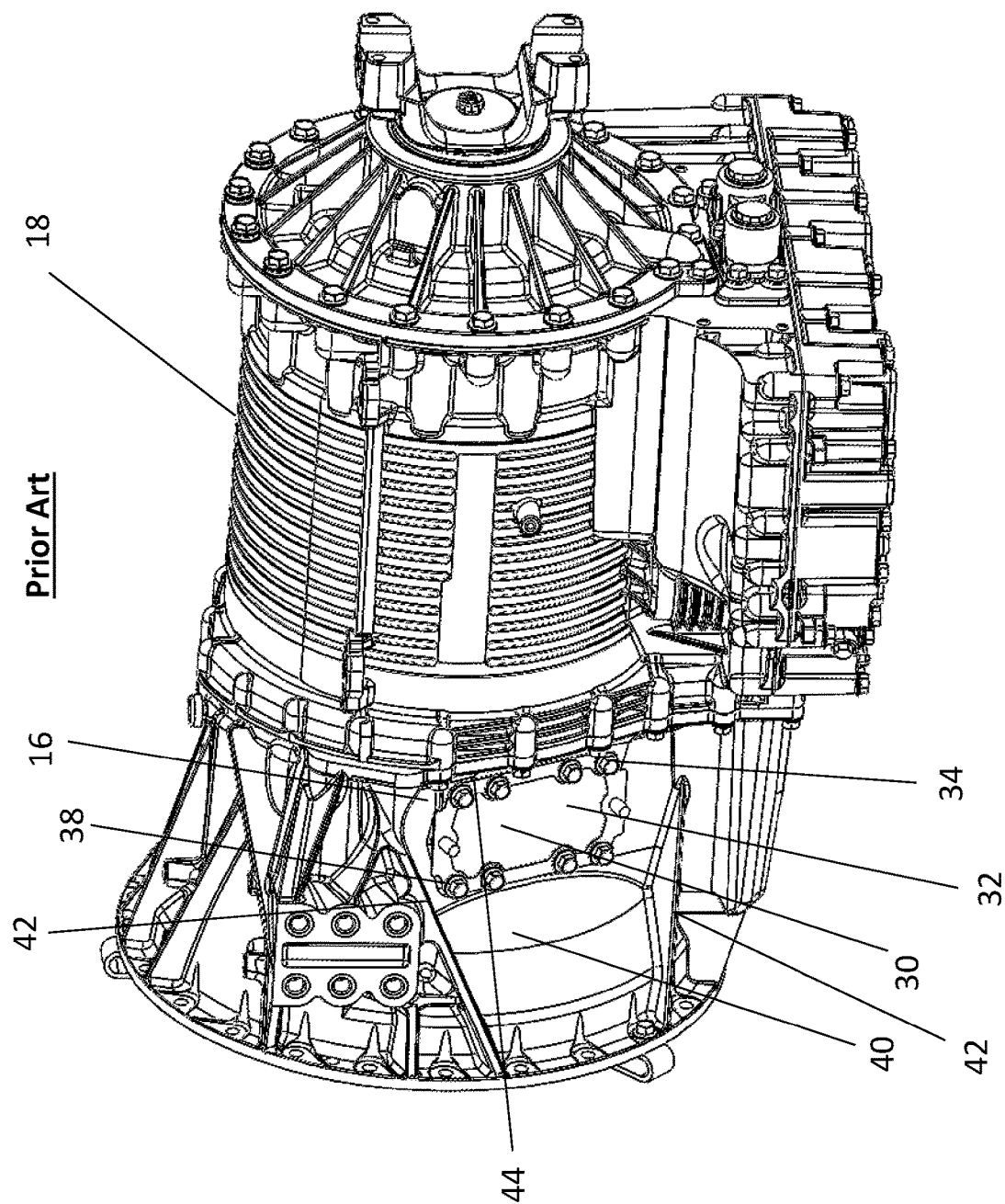
FIG. 2A depicts a side perspective view of a conventional transmission housing, with a cover plate atop the PTO opening and no PTO present.
Figure 2B:
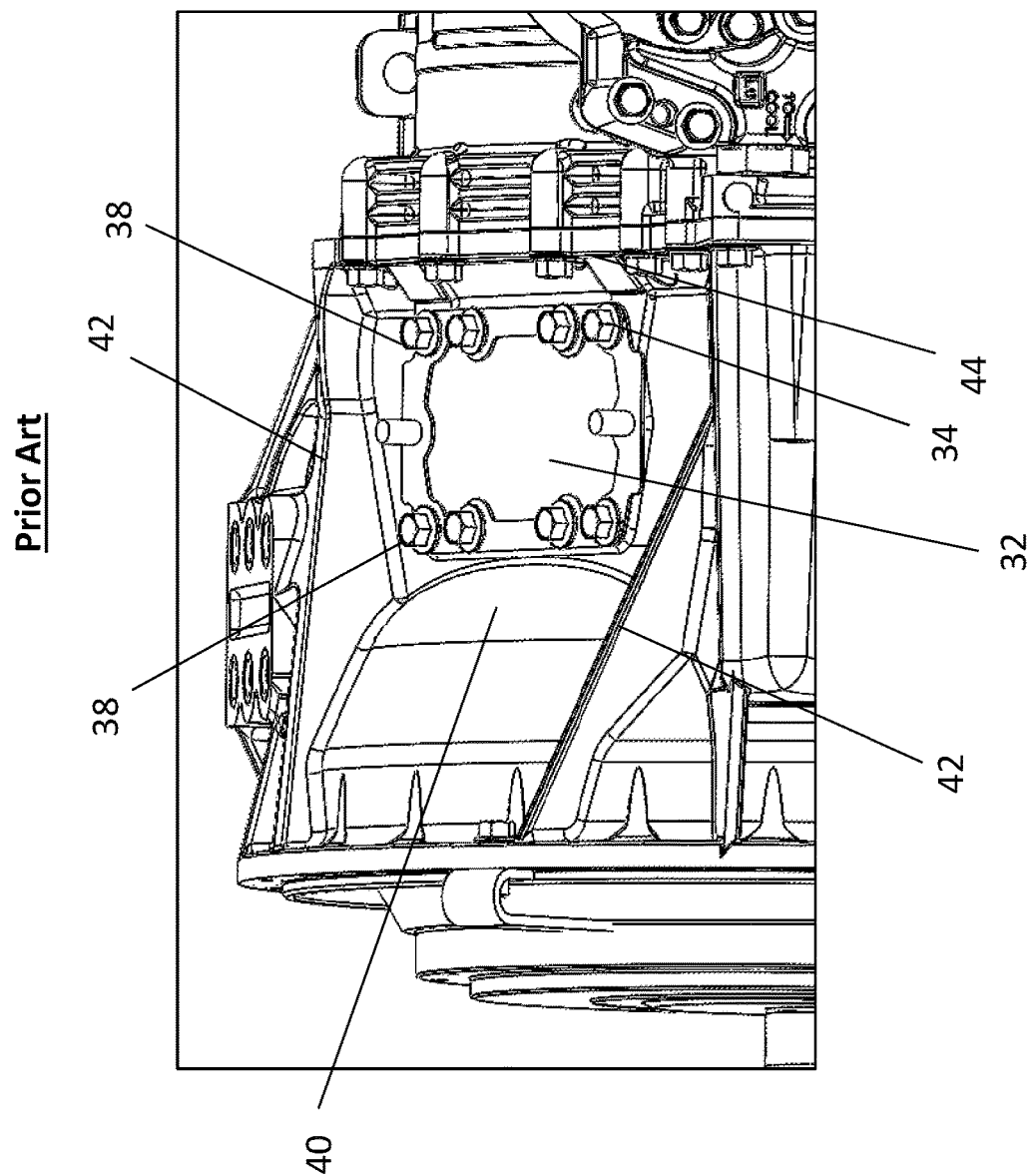
FIG. 2B depicts an enlarged partial side/bottom perspective view of the conventional transmission housing of FIG. 2A showing in greater detail how the PTO mounting surface is recessed relative to the bell housing, side ribs, and rear flange as is common in many conventional transmission housings.
Figure 3B:
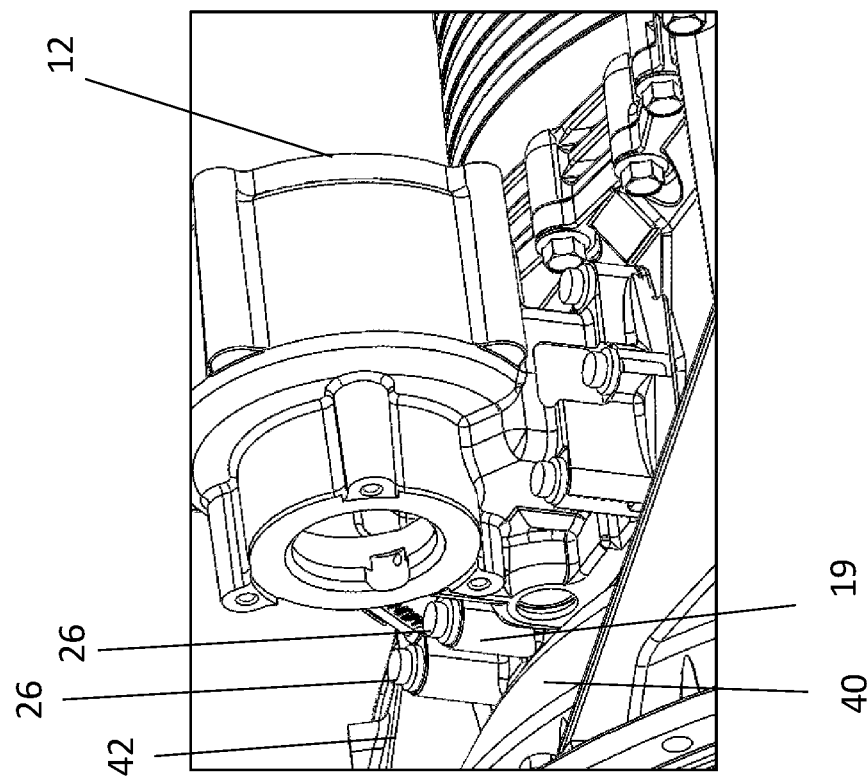
FIG. 3B depicts an isometric view of the first embodiment of the PTO housing of the present invention secured to the conventional transmission housing.
Figure 3A:
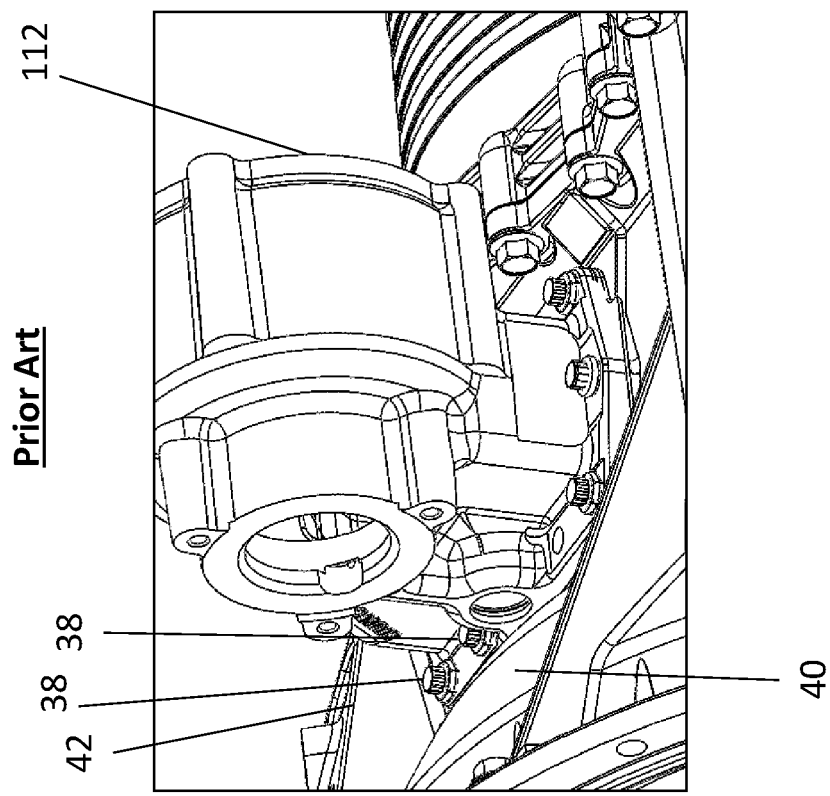
FIG. 3A depicts an isometric view of a first embodiment of a conventional PTO housing secured to a conventional transmission housing.
Figure 4B:
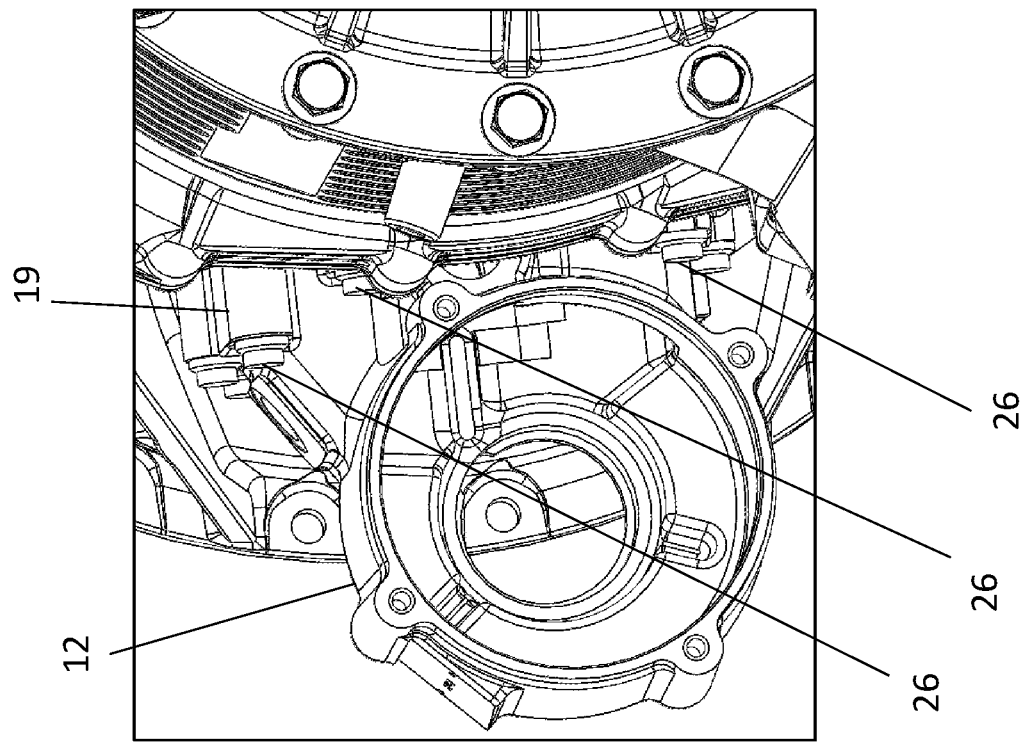
FIG. 4B depicts a rear view of the embodiment of the PTO housing of the present invention secured to the conventional transmission housing.
Figure 4A:
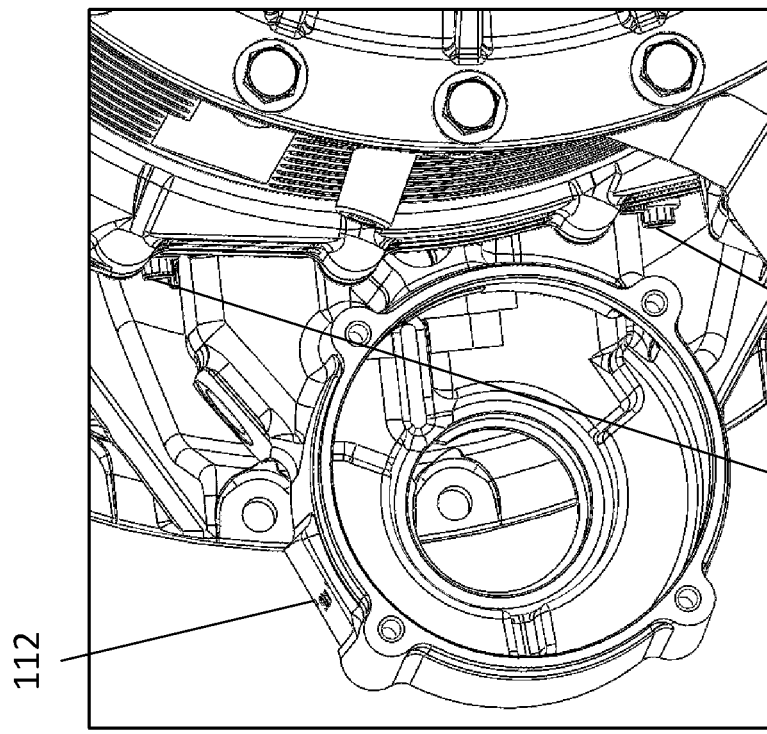
FIG. 4A depicts a rear view of the conventional PTO housing secured to the conventional transmission housing.
Figure 5B:
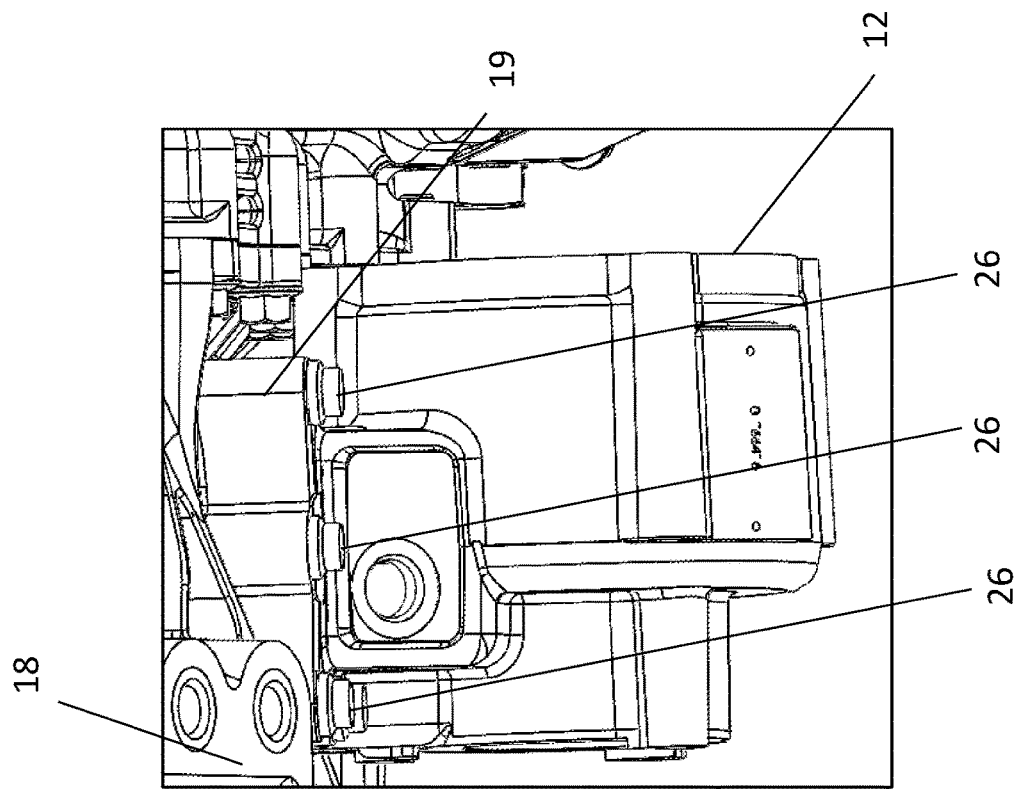
FIG. 5B depicts a top view of the embodiment of the PTO housing of the present invention secured to the conventional transmission housing.
Figure 5A:
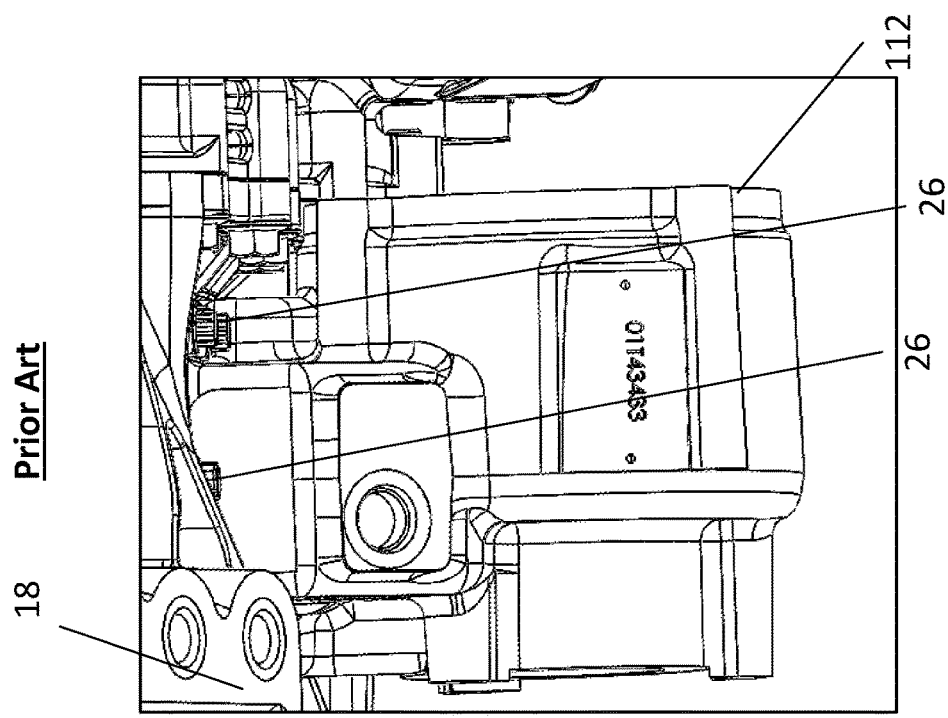
FIG. 5A depicts a top view of the conventional PTO housing secured to the conventional transmission housing.

FIGS. 2A and 2B show a conventional transmission housing 18. The transmission housing 18 includes a PTO opening 30 through which an input gear located at least partially within a PTO would engage a transmission gear located at least partially within the transmission housing 18. The PTO mounting surface 16 surrounds the PTO opening 30. In the conventional transmission housing 18 shown in FIGS. 2A and 2B, a cover plate 32 covers the PTO opening 30. The cover plate 32 is secured to the transmission housing 18 using a plurality of conventional fasteners 34, each having a externally threaded cylindrical shaft 36 and a head 38 on one end of the shaft 36, the head 38 having a larger diameter than the threaded shaft 36. Each conventional fastener 34 extends through the cover plate 32 and into a transmission channel 28. As more easily seen in FIG. 2B, the PTO mounting surface 16 is recessed relative to other components of the transmission housing 18, such as the bell housing 40, side ribs 42, rear flange 44, which limits access to the conventional fasteners 34. An installer who wishes in install or remove conventional fasteners 34 from the transmission housing 18 using a wrench faces challenges as it may be difficult to engage the heads 38 of the fasteners 34 with the wrench, and once engaged, the wrench would have a severely limited range of motion due to interference from components of the transmission housing 18.

Referring now to FIGS. 3A, 3B, 4A, 4B, 5A, 5B, 6A and 6B, these figures show side-by-side comparisons of a conventional PTO housing 112 (the "A" figures) and the PTO housing 12 according to the present invention (the "B" figures) from various views, both PTO housings 112, 12 being attached to a conventional transmission housing 18. As compared to the conventional PTO housing 112, the PTO housing 12 of the present invention includes elongated channels 20, each extending through a channel boss 19, as compared to the comparatively short conventional channels 120 in the conventional PTO housing 112. The PTO housing 12 receives elongated fasteners 22 as compared to the conventional fasteners 34 used with the conventional PTO housing 112. In some embodiments, the conventional fasteners 34 are 33 mm in length and the conventional channels 120 are 10.4 mm or 11.2 mm in length. In some embodiments, the elongated fasteners 22 are greater than 33 mm in length, greater than 35 mm in length, or at least 40 mm in length. In certain embodiments, the elongated fasteners 22 are 40 mm or 60 mm in length. In further embodiments, the elongated channels 20 are 23.5 mm or 45.7 mm in length. In some embodiments, the length of the elongated channel 20 is not less than 40% the length of the elongated fastener 22 installed in that channel 20. In other embodiments, the length of the elongated channel 20 is not less than 50% the length of the elongated fastener 22 installed in that channel 20. In further embodiments, the length of the elongated channel 20 is not less than 55% the length of the elongated fastener 22 installed in that channel 20. In certain embodiments, the length of the elongated channel 20 is 55% to 80% the length of the elongated fastener 22 installed in that channel 20. As an example, an elongated channel 20 with a length of 23.5 mm receives an elongated fastener 22 with a length of 40 mm, such that the length of the channel 20 is 58.75% the length of the fastener 22. As another example, an elongated channel 20 with a length of 45.7 mm receives an elongated fastener 22 with a length of 60 mm, such that the length of the channel 20 is 76.16% the length of the fastener 22.

The heads 26 of the elongated fasteners 22 are positioned further from the PTO mounting surface 16 as compared conventional fasteners 34, providing greater clearance from various components of the transmission housing 18. In particular, note the greater spacing between heads 26 and side rib 42 and bell housing 40 in FIG. 3B as compared to the spacing between heads 38 and side rib 42 and bell housing 40 in FIG. 3A. Also, three heads 26 are visible in FIG. 4B, while only two of the three corresponding heads 38 are visible in FIG. 4A, the third being obscured and difficult to access behind components of the transmission housing 18. Similarly, three heads 26 are visible in FIG. 5B, while only two of the three corresponding heads 38 are visible in FIG. 5A, the third being obscured and difficult to access behind components of the transmission housing 18. In a more dramatic example, three heads 26 are visible in FIG. 6B, while all of the corresponding heads 38 are obscured in FIG. 6A. In addition to improving access to the securing fasteners, this novel design also provides the benefit of better torque retention due to the increased bolt stretch of the elongated fasteners 22 within the elongated channels 20, thereby mitigating loosening of the PTO housing 12 resulting from vibration.

Figure 7B:
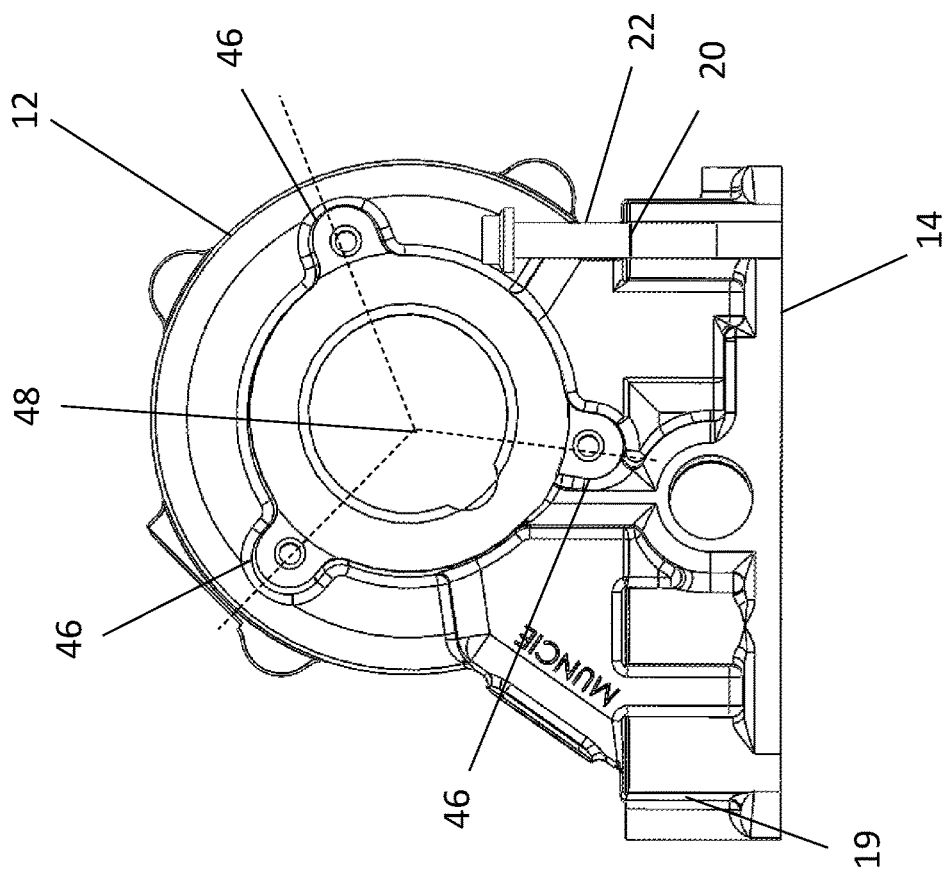
FIG. 7B depicts a side view of the embodiment of the PTO housing of the present invention.
Figure 7A:
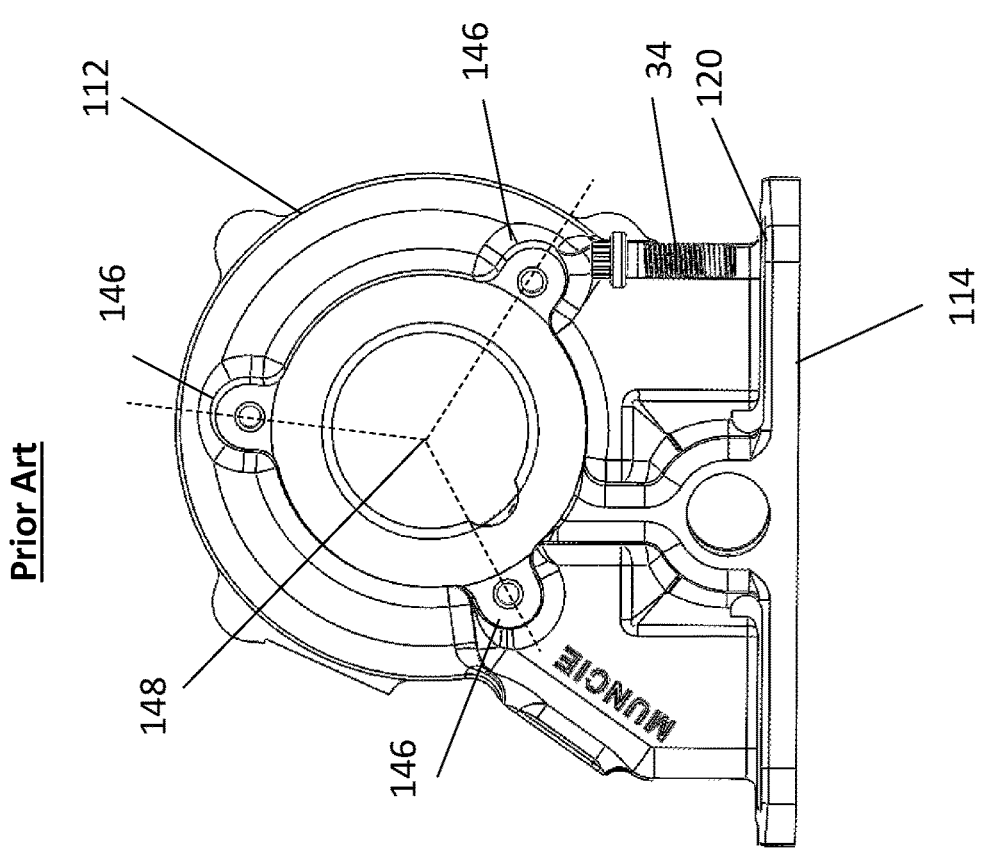
FIG. 7A depicts a side view of the conventional PTO housing.

As shown in FIG. 7A, a conventional PTO housing 112 includes three screw bosses 146 radially spaced apart equidistantly around a central point 148, as indicated by dashed lines. The screw bosses 146 extend from the PTO housing substantially parallel to the transmission mounting surface 114. The screw bosses 146 are spaced apart approximately 120 degrees from each other, with two screw bosses 146 positioned closer to the transmission mounting surface 114 than the central point 148 and the third screw boss positioned further from the transmission mounting surface 114 than the central point 148. This conventional pattern of screw bosses 146 limits the length of fasteners 34 that may be used with a conventional PTO housing 112 as interference between an elongated fastener and a screw boss 146 would prevent the fastener from being aligned for axial insertion into the channel 120.

In some embodiments, as most easily seen in FIG. 7B, the PTO housing 12 of the present invention includes three screw bosses 46 radially spaced apart equidistantly around a central point 48 with a different pattern than in the conventional PTO housing. The screw bosses 46 extend from the PTO housing substantially parallel to the transmission mounting surface 114 but, as compared to the pattern of screw bosses 146 shown in FIG. 7A, the positioning of the screw bosses 46 is rotated about the central point 48 to avoid interference between any screw boss 46 and insertion of an elongated fastener 22 into an elongated channel 20. Adopting the pattern of screw bosses shown in FIG. 7B synergizes with the elongated channels 20 and channel bosses 19 to allow use of elongated fasteners 22, as simply lengthening conventional channels 120 would not allow axial insertion of elongated fasteners 22 into the longer channels due to interference between the fasteners 22 and the screw bosses 146 arranged in the conventional screw boss pattern.

Figure 8B:
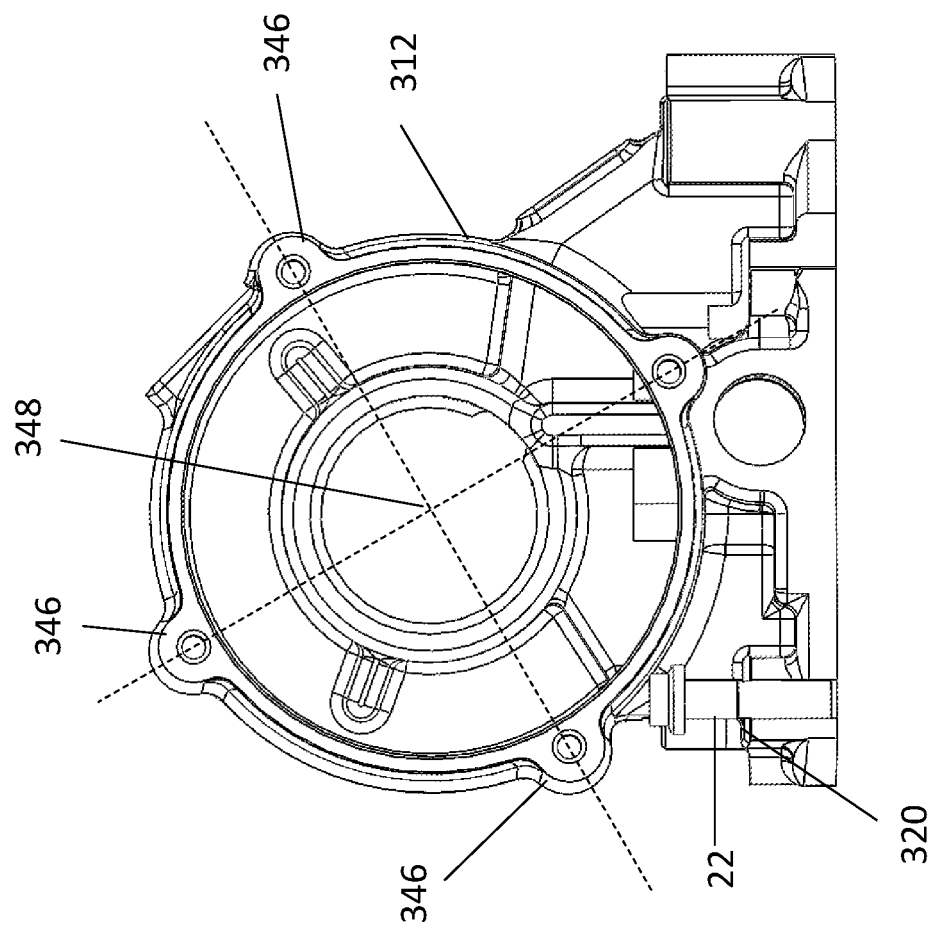
FIG. 8B depicts a side view of a second embodiment of a PTO housing of the present invention.
Figure 8A:
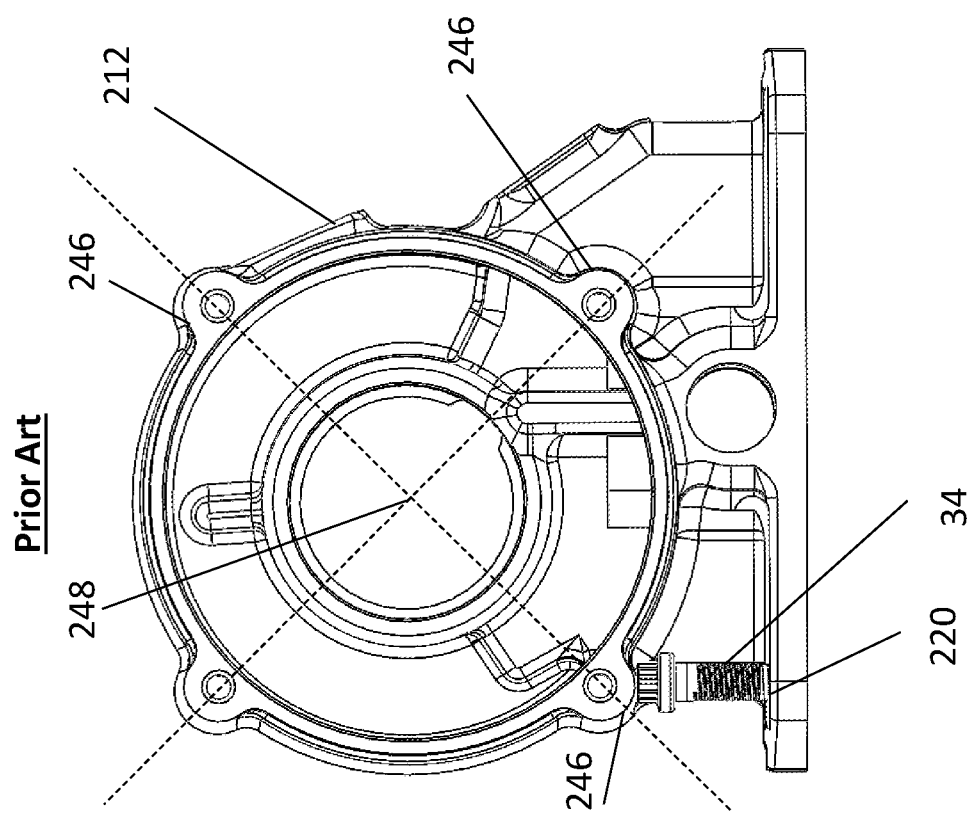
FIG. 8A depicts a side view of a second embodiment of a conventional PTO housing.

FIG. 8A shows a second embodiment of a conventional PTO housing 212. This PTO housing 212 includes four screw bosses 246 radially spaced apart equidistantly around a central point 248, as indicated by dashed lines. The screw bosses 246 are spaced apart approximately 90 degrees from each other. As evident in FIG. 8A, the bottom left screw boss 246 limits the length of the fastener 34 that may be used with this second embodiment of a conventional PTO housing 212 as interference between an elongated fastener and the bottom left screw boss 246 would prevent the fastener from being aligned for axial insertion into the conventional channel 220.

FIG. 8B shows a second embodiment of a PTO housing 312 according to the present invention. As compared to the pattern of four screw bosses 246 shown in FIG. 8A, the four screw bosses 346 shown in FIG. 8B are rotated about central point 348 to avoid interference between any screw boss 346 and insertion of an elongated fastener 22 into an elongated channel 320. FIGS. 8A and 8B show, similar to FIGS. 7A and 7B, that screw bosses 146, 246 of conventional PTO housings 112, 212 are not suitable for use with elongated fasteners 22, and that PTO housings of the present invention 12, 312 are adapted to avoid interference by orienting their screw bosses 46, 346 in directions other than the directions of the elongated channels 20, 320.

Figure 9B:
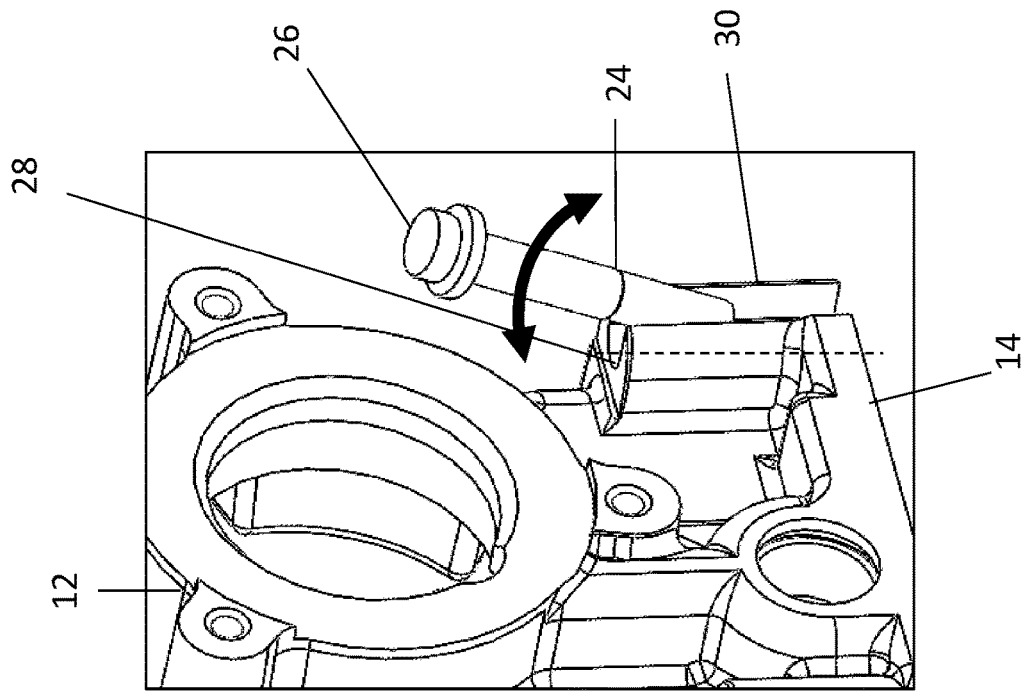
FIG. 9B depicts a partial side perspective view of the first embodiment of the PTO housing of the present invention and an elongated fastener.
Figure 9A:
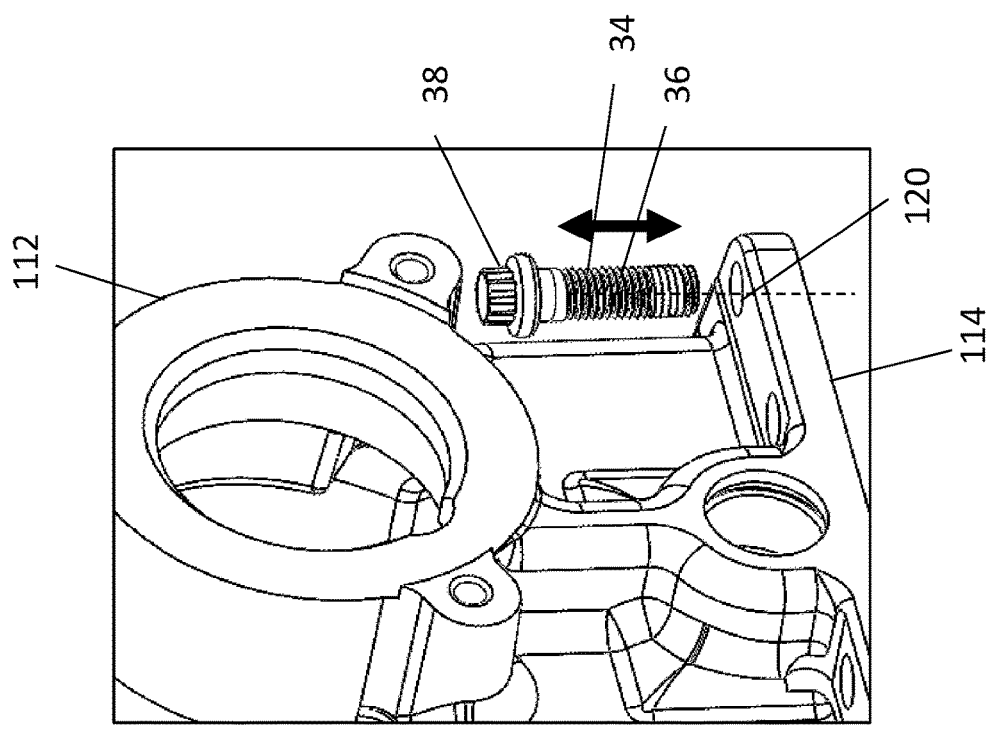
FIG. 9A depicts a partial side perspective view of the first embodiment of the conventional PTO housing and a conventional fastener.

In some embodiments, as most easily seen in FIGS. 1 and 9B, the plurality of channels 20 includes at least one slotted channel 50, wherein the slotted channel 50 partially, but not completely, radially surrounds elongated fastener 22 when the fastener 22 is inserted therein. The slotted channel 50 includes an opening 52 perpendicular to the axis of the slotted channel 50 with dimensions greater than the diameter of the shaft 24, but smaller than the diameter of the head 26, such that the shaft 24 may be inserted into the slotted channel 50 through the opening 52, as shown in FIG. 9B. The opening 52 may extend partially along the length of the slotted channel 50 in some embodiments or, in other embodiments, may extend along the entire length of the slotted channel 50. The slotted channel 50 provides additional freedom of movement for the fastener 22 while securing the PTO housing 12 against the transmission housing 18, as the fastener 22 may be inserted along the axis (indicated by dashed line) of the slotted channel 50, through the opening 52, or a combination thereof, as indicated by the curved arrow in FIG. 9B. In comparison, as shown in FIG. 9A, a conventional PTO housing includes only conventional channels 120 which radially completely surround the shaft 34 and allow fasteners 34 to be inserted only along the axis (indicated by dashed line) of the only a single direction for fastener insertion, as indicated by the straight arrow in FIG. 9A.

While examples, one or more representative embodiments, and specific forms of the disclosure, have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

The invention claimed is:

1. A power takeoff (PTO), comprising: a PTO housing including
　a transmission mounting surface,
　a channel boss extending opposite the transmission mounting surface, wherein the channel boss includes an elongated channel extending therethrough and terminating at the transmission mounting surface, and
　a plurality of screw bosses extending from the PTO housing substantially parallel to the transmission mounting surface, wherein the plurality of screw bosses are radially spaced apart equidistantly around a central point; and
an elongated fastener, sized to be received into the elongated channel; and
wherein the plurality of screw bosses are rotated about the central point such that insertion of the elongated fastener into the elongated channel does not interfere with the plurality of screw bosses.

2. The PTO of claim 1, wherein the elongated channel includes a length, wherein the elongated fastener includes a length, and wherein the length of the elongated channel is not less than 40% of the length of the elongated fastener received by the elongated channel.

3. The PTO of claim 2, wherein the length of the elongated channel is not less than 50% of the length of the elongated fastener.

4. The PTO of claim 3, wherein the length of the elongated channel is not less than 55% of the length of the elongated fastener.

5. The PTO of claim 3, wherein the length of the elongated channel is 55% to 80% of the length of the elongated fastener.

6. The PTO of claim 1, wherein the channel boss is a plurality of channel bosses, each of the plurality of channel bosses includes one elongated channel.

7. The PTO of claim 6, wherein at least one elongated channel is a slotted channel which, when receiving an elongated fastener, partially, but not completely, radially surrounds a shaft of the elongated fastener.

8. The PTO of claim 7, wherein the slotted channel includes an opening perpendicular to an axis of the slotted channel.

9. The PTO of claim 8, wherein the opening is larger than the diameter of the shaft of the elongated fastener but smaller than a diameter of a head of the elongated fastener.

* * * * *